United States Patent [19]

Wienen et al.

[11] Patent Number: 4,752,194
[45] Date of Patent: Jun. 21, 1988

[54] MAGNETICALLY COUPLED PUMP WITH A BIPARTITE SEPARATING POT

[75] Inventors: Kurt Wienen, Straelen; Alfred Mersch, Duisburg; Hans P. Krahmer-Mollenberg, Grefrath, all of Fed. Rep. of Germany

[73] Assignee: Richter Chemi-Technik GmbH, Fed. Rep. of Germany

[21] Appl. No.: 111,482

[22] Filed: Oct. 22, 1987

[30] Foreign Application Priority Data

Oct. 25, 1986 [DE] Fed. Rep. of Germany ....... 3636404

[51] Int. Cl.⁴ .................. F04B 17/00; F04B 35/04
[52] U.S. Cl. ................ 417/420; 417/423 R; 464/29
[58] Field of Search .............. 417/373, 420, 423 M, 417/423 P, 423 T, DIG. 1; 464/29

[56] References Cited

U.S. PATENT DOCUMENTS

| 4,115,040 | 9/1978 | Knorr | 417/420 |
| 4,120,618 | 10/1978 | Klaus | 417/420 |
| 4,613,289 | 9/1986 | Kotera | 417/420 |
| 4,645,433 | 2/1987 | Hauenstein | 417/420 |
| 4,648,808 | 3/1987 | Hauenstein | 415/106 X |

Primary Examiner—Leonard E. Smith
Assistant Examiner—Eugene L. Szczecina, Jr.
Attorney, Agent, or Firm—Hill, Van Santen, Steadman & Simpson

[57] ABSTRACT

A magnetic coupler for a magnetic centrifugal pump includes inner and outer rotors having arranged thereon a plurality of permanent magnetics mounted in opposition. A bipartite separating pot that is mounted between the inner and outer rotor and is composed of two electrically non-conductive separating pots nested one in the other, whereby an inner one of the separating pots is of a chemically resistant material and the outer one of the separating pots is of a fiber composite.

9 Claims, 1 Drawing Sheet

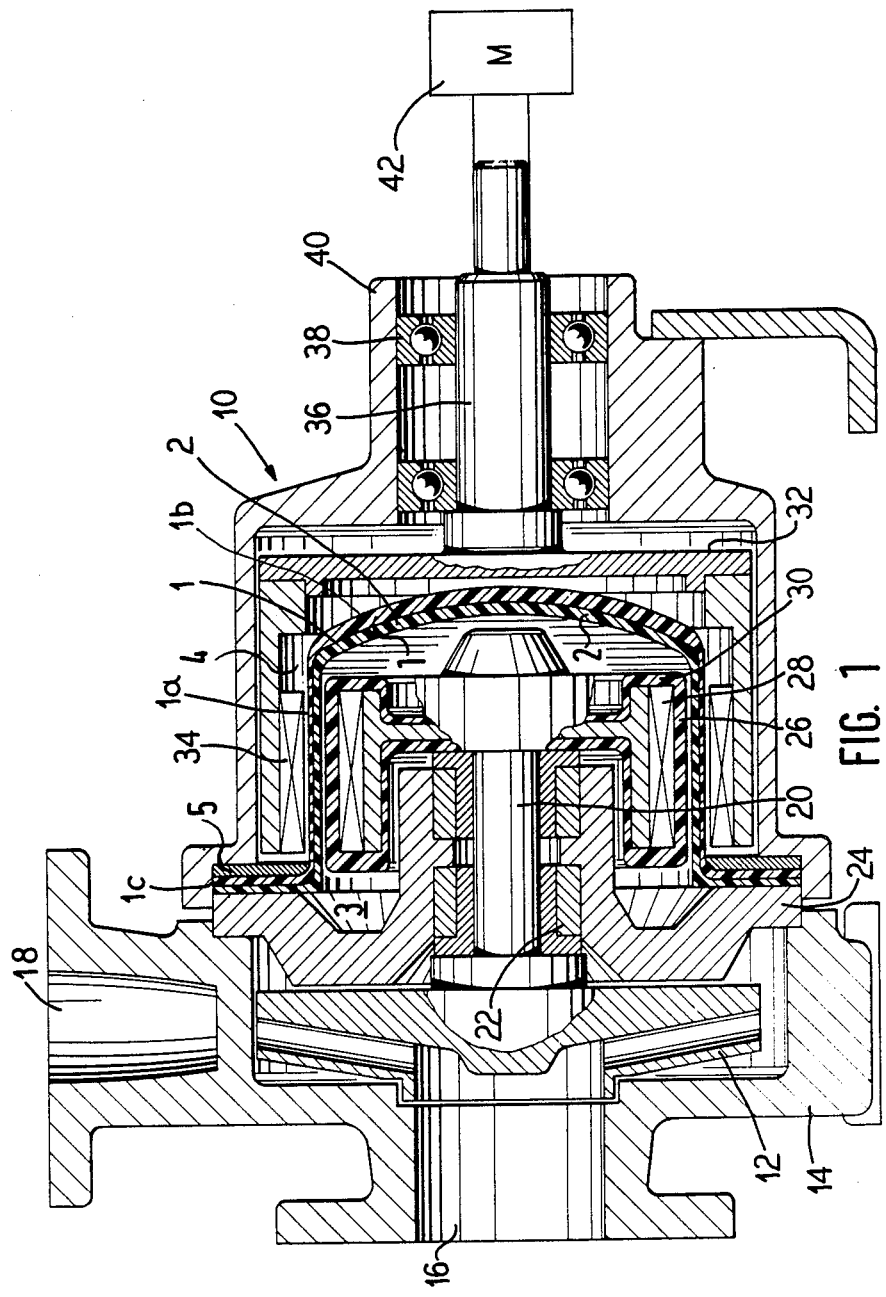

MAGNETICALLY COUPLED PUMP WITH A BIPARTITE SEPARATING POT

BACKGROUND OF THE INVENTION

1. Field of the Invention

The present invention relates generally to a magnetic rotational coupler, and more particularly to a separating pot for use in a magnetic centrifugal pump.

2. Description of the Related Art

Magnetic centrifugal pumps are utilized where an absolutely tight seal toward the outside is a concern since toxic, caustic or aggressive agents are to be pumped without escape into the environment. Such pumps preferably have suitable plastic linings for protection of the pump parts. Fluoroplastics are generally used as the plastic lining material in devices for use with highly aggressive agents.

A magnetic rotational coupler portion is provided in the magnetic centrifugal pump, the coupler portion including first and second magnetically coupled rotors separated by a separating diaphragm. A particular type of magnetic coupler has inner and outer rotors including magnets disposed in mutually coaxial cylinders for magnetic coupling between the rotors. A separating diaphragm in the shape of a pot is integrated between the force transmitting magnets of the inner and outer rotor members in such magnetic centrifugal pumps. The separating pot is to be also protected against attach by the toxic or caustic agent, at least at its inner surface.

The traditional separating pots are generally of one of three materials. In particular, the separating pot is either of solid plastic, of metal which includes a plastic insert or lining or which is enameled, or is of ceramic. All three materials, however, have severe disadvantages and limits when used in magnetic centrifugal pumps.

Solid plastic separating pots are limited to application in very low pressure and/or very low temperature stress situations. This type of separating pot can be used only within very limited operating conditions.

The use of metal separating pots having either a plastic or enamel protection results in the inducement of eddy currents in the metal due to the rotation of the inner and outer magnets. The eddy currents lead to losses in power transmission and to heating of the metal portions disposed between the magnets. Since the amount of heating is dependent upon the power transmitted, high power pumps can result in considerable heating. The insulating effect of a plastic layer over the metal reduces the amount of heat elimination possible through the agent being pumped. The temperature of the metal separating pot, thus, becomes so high that the plastic protective lining is deformed.

When an enameled metal separating pot is used, the heat generated in the metal is eliminated by conduction to the agent being pumped. This can cause the liquid to evaporate or cavitate, particularly when the agent to be pumped flows into the pump at elevated temperatures. Thus, the use of hot agents is limited in both cases. When the magnetic centrifugal pump is run in a dry state without cooling agents for the metal separating pot, inadmissible temperature limits are reached very quickly due to the eddy currents. Also, the power losses that occur when a metal pot is used must be compensated for by the provision of a larger motor and by higher current consumptions.

The use of a ceramic separating pot also has disadvantages. In particular, since ceramics are not well suited for withstanding tensile forces, a ceramic separating pot must be formed with very thick walls. This enlarges the spacing between the magnets of the inner and outer rotor and, thus, reduces the power that is transmitted thereby. Since the ceramic material is extremely sensitive to impact, the separating pot can be easily destroyed during a malfunction, such as a pressure surge or damage to a bearing. The destroyed separating pot can, thus, lead to escape of the toxic or caustic agent which was sought to be contained.

SUMMARY OF THE INVENTION

An object of the invention is to provide a pressure-proof and temperature-proof, chemically resistant centrifugal pump having a magnet drive for use, for example, in the chemical industry, which overcomes the disadvantages recited hereinabove.

This and other objects are achieved in a magnetic centrifugal pump having a separating pot disposed between inner and outer magnetic rotors, where the separating pot is formed of two electrically non-conductive pot layers nested in one another, a first layer being chemical resistant and a second layer being formed of a fiber composite. In one development, a composite design of two separating pots of electrically non-conductive materials is provided, wherein the outer separating pot is of a fiber composite such as, for example, plastic reinforced with carbon fibers (CFK) or carbon reinforced with carbon fibers (CFC) to absorb the forces which such separating pots are subject. The inner separating pot is of a corrosion resistant material such as, for example, a suitable plastic to protect the outer separating pot against contact with the agent.

The separating pots are shaped so that only tensile forces occur in the cylindrical walls of the separating pots between the magents. Fiber composites, of which the outer separating pot is formed, readily withstand such tensile forces. To further enable the fibers in the composite material to withstand the tensile forces, the fibers are oriented in defined directions depending upon the direction of the tensile forces. The use of fiber composites enables wall portions of the separating pot to be extremely thin so that a very small magnet spacing is possible, resulting in the transmission of higher magnetic forces. A floor or end of the separating pot and a connecting flange for mounting the separating pot may be subject to bending forces and so can be formed with thicker walls without causing any problems resulting in greater magnet spacing or less power transmission.

Since the outer separating pot is of a fiber composite such as, for example, a epoxy resin reinforced with carbon fibers, no eddy currents are produced and, thus, no heat is produced either. The inner separating pot is of a plastic which is preferably a highly corrosion resistant fluoroplastic to provide a protective layer for the fiber composite outer separating pot.

BRIEF DESCRIPTION OF THE DRAWINGS

FIG. 1 is a longitudinal cross section through a magnetic centrifugal pump according to the principles of the present invention; and FIG. 2 is a partial cross section similar to FIG. 1 showing a second embodiment.

DESCRIPTION OF THE PREFERRED EMBODIMENTS

FIG. 1 shows a magentic centrifigal pump in a housing 10 including an impeller 12 within an impeller housing 14. The impeller housing 14 has a bottom inlet 16 into which a fluid, such as a caustic or toxic agent, is drawn for pumping by the impeller 12. The centrifugal impeller housing 14 is also provided with a pump outlet 18 from which the fluid is pumped. The impeller 12 is rotationally mounted on an impeller shaft 20, the impeller shaft 20 being supported by bearings 22 in an intermediate housing portion 24; the bearings 22 are generally open bearings. To an opposite end of the impeller shaft 20 is mounted an inner rotor 26 which includes a plurality of permanent magnets 28 disposed generally in a cylindrical configuration. The inner rotor 26 is coated by a corrosion resistant plastic coating 30 since the agent can reach the inner rotor 26 through the bearings 22.

Mounted coaxially with the inner rotor 26 is an outer rotor 32 including a plurality of permanent magents 34 provided in a cylindrical configuration in opposed relation to the permanent magnets 28 of the inner rotor 26. Thus, the outer rotor 32 is hollow and mounted over the inner rotor 26 for magnetic rotational coupling therebetween. A drive shaft 36 is connected to the outer rotor 32 and is rotationally mounted by a plurality of bearings 38 in an upper portion 40 of the pump housing 10 which preferrably is mounted in a sealed relationship with, for example, a container (not shown). The drive shaft 36 is connected to a drive motor 42.

Since the agents to be pumped are generally quite hazardous an absolutely tight seal is required to prevent escape of the agents. Thus, seals having relatively movable surfaces should be avoided in such a device. The magnetic centrifugal pump shown in FIG. 1 avoids the use of movable seals and provides a fluid tight seal by dividing the pump into a product space 3 and a drive space 4 through the use of separating pots 1 and 2. Thus, although an agent being pumped may get into the product space 3 from the region of the impeller 12, the agent is prevented from escaping into the drive space 4 by the separating pots 1 and 2.

The outer one of the separating pots 1 is manufactured of an electrically non-conductive fiber composite that is strong enough to absorbs the pressure forces of the pumped agent which occur in the product space 3. The separating pot 1 is shaped so that only tensile forces occur in the cylindrical walls of the separating pot 1, so that with the fiber construction it is possible to form the walls 1a extremely thin. A floor portion 1b and a flange portion 1c of the separating pot 1 are thicker than the walls 1a to withstand bending forces which result, for example, from pressures in the pumped agent. A metal ring 5 is provided to support the flange portion 1c. Since no magnetic forces are present in the region of a metal ring 5, no appreciable eddy currents are produced in the ring and heating thereof is avoided.

An inner separating pot 2 protects the outer pot 1 against corrosion which may otherwise result from the agent to be pumped. Depending upon the demands, the inner separating pot 2 is formed of a suitable electrically non-conductive, corrosion-resistant material. In one example, the inner separating pot 2 is of a highly corrosion resistant fluoroplastic.

In an alternate embodiment of the invention shown in FIG. 2, the inner rotating unit which includes the impeller 12, the impeller shaft 20 and the inner rotor 26 is guided in a bearing 50 attached between the floor portion 1b of the separating pot 1 and the upper end of the inner rotor 26. However, this is not necessary, as shown in FIG. 1.

Although the present invention is described as for use with a centrifugal pump for caustic or other hazardous agents, it is of course possible to use the present device with nonhazardous agents and/or with other rotationally driven devices in place of a centrifugal pump.

Although other modifications and changes may be suggested by those skilled in the art, it is the intention of the inventors to embody within the patent warranted hereon all changes and modifications as reasonably and properly come within the scope of their contribution to the art.

I claim:

1. A magnetically coupled pump, comprising:
   a first rotor having first permanent magnets;
   a drive motor connected to said first rotor;
   a second rotor having second permanent magnets magnetically coupled to said permanent magnets of said first rotor;
   an impeller for the pump coupled to said second rotor for rotation;
   a separating pot disposed between said first and second rotors and effective to provide a seal for an agent to be pumped, said separating pot being formed of first and second electrically non-conductive pots nested together, said first pot being of material resistant to the agent to be pumped and said second pot being of a fiber composite.

2. A magnetic centrifugal pump as claimed in claim 1, wherein said separating pot has wall portions and a floor portion and said second rotor and said impeller are free of said floor portion of said separating pot.

3. A magnetic centrifugal pump as claimed in claim 1, further comprising:
   bearings are provided in said floor portion of said separating pot and said second rotor is guided in said bearing.

4. A magnetic rotational coupling for transmitting rotational forces between a first and a second shaft, comprising:
   an outer rotor connected to said first shaft and including a plurality of permanent magnets;
   an inner rotor rotationally mounted within said outer rotor and connected to said second shaft, said inner rotor including a plurality of second permanent magnets mounted in opposed relation to said first permanent magnets of said outer rotor for magnetic coupling to said permanent magnets of said outer rotor; and
   means providing a fluid tight seal between said inner rotor and said outer rotor, said means including a cup-shaped separating wall disposed between said inner rotor and said outer rotor, said separating wall being stationarily mounted and formed by first and second nested cup-shaped wall layers.

5. A magnetic rotational coupling as claimed in claim 4, wherein said first cup-shaped wall layer is of a plastic material and said second cup-shaped wall layer is of a fiber-resin material.

6. A magnetic rotational coupling as claimed in claim 5, wherein said plastic material is a fluoroplastic, and said fiber-resin material is epoxy resin reinforced with carbon fibers.

7. A magnetic coupling for a centrifugal pump for use in pumping caustic agents, the centrifugal pump having an impeller rotationally mounted on an impeller shaft in a pump housing with a pump inlet and a pump outlet, a drive shaft being rotationally mounted in the pump housing coaxially with the impeller shaft for connection to a drive motor, comprising:
  an outer rotor member rotationally mounted in the pump housing on the drive shaft, said outer rotor member including an arrangement of permanent magnets mounted in a first generally cylindrical configuration coaxially disposed relative to an axis of rotation of said outer rotor member;
  an inner rotor member rotationally mounted in the pump housing on the impeller shaft, said inner rotor member including an arrangement of permanent magnets mounted in a second generally cylindrical configuration of lesser diameter than said first cylindrical configuration of permanent magnets in said outer rotor member, said second configuration of permanent magnets being disposed coaxially with said first configuration with said permanent magnets of said respective inner and outer rotor members in opposed relation; and
  a separating pot including a substantially cylindrical wall portion and an end face closing a first end of cylindrical wall portion, a flange extending substantially radially outwardly from a second opposite end of said cylindrical wall portion, said separating pot being disposed between said inner and outer rotor members to provide a fluid tight seal therebetween with said flange being clamped between portions of said pump housing, said separating pot consisting essentially of inner and outer layers affixed to one another, said inner layer being of a fluoroplastic material and said outer layer being of epoxy resin and carbon fiber material.

8. A magnetic coupling as claimed in claim 7, wherein said substantially cylindrical wall portion of said outer layer of said separating pot is substantially thinner than said end face and said flange of said outer layer.

9. A magnetic coupling as claimed in claim 8, further comprising:
  a metal ring supporting said flange of said separating pot in clamped arrangement between said portions of said portions of said pump housing.

* * * * *